United States Patent
Tews et al.

(10) Patent No.: US 8,480,361 B1
(45) Date of Patent: Jul. 9, 2013

(54) ENHANCED SYSTEM AND METHOD TO INCREASE THE TOTAL-TO-STATIC PRESSURE RATIO ACROSS A RAM AIR TURBINE USING SURFACE CONTOURED FLOW AGITATORS

(75) Inventors: Brian E. Tews, Melbourne, FL (US); Daniel K. Van Ness, II, Rockledge, FL (US); Christian O. Rodriguez, Melbourne, FL (US)

(73) Assignee: Mainstream Engineering Corporation, Rockledge, FL (US)

( * ) Notice: Subject to any disclaimer, the term of this patent is extended or adjusted under 35 U.S.C. 154(b) by 836 days.

(21) Appl. No.: 12/693,547

(22) Filed: Jan. 26, 2010

(51) Int. Cl.
*F03D 11/00* (2006.01)
(52) U.S. Cl.
USPC ...................................... 415/211.2
(58) Field of Classification Search
USPC ......................... 415/211.2; 60/262
See application file for complete search history.

(56) References Cited

U.S. PATENT DOCUMENTS

| | | | |
|---|---|---|---|
| 3,409,228 A | 11/1968 | Mehr | |
| 3,463,402 A | 8/1969 | Langston, Jr. | |
| 4,149,375 A | 4/1979 | Wynosky et al. | |
| 4,586,873 A * | 5/1986 | Lepretre et al. | 417/54 |
| 4,819,425 A | 4/1989 | Farquhar et al. | |
| 5,435,127 A | 7/1995 | Luffy et al. | |
| 5,836,738 A * | 11/1998 | Finney | 415/60 |
| 6,804,948 B2 | 10/2004 | Oishi | |
| 6,877,960 B1 * | 4/2005 | Presz et al. | 417/198 |
| 2008/0105487 A1 | 5/2008 | Loheac et al. | |
| 2008/0105488 A1 | 5/2008 | Dussillols et al. | |
| 2009/0263244 A1 | 10/2009 | Presz, Jr. et al. | |
| 2010/0068029 A1 * | 3/2010 | Presz et al. | 415/1 |

* cited by examiner

*Primary Examiner* — Ninh H Nguyen

(57) ABSTRACT

The total-to-static pressure ratio is increased across a Ram Air Turbine (RAT) by developing a localized accelerated flow of free-stream air near the discharge of the turbine rotor exhaust. This localized accelerated flow decreases the static pressure at the exit of the turbine and allows for additional power generation for a given free-stream flight condition. Lobe mixers in various locations improves mixing between the accelerated flow and the turbine exhaust flow, and the combined exhaust flow and the free-stream air surrounding the aerodynamic body.

20 Claims, 6 Drawing Sheets

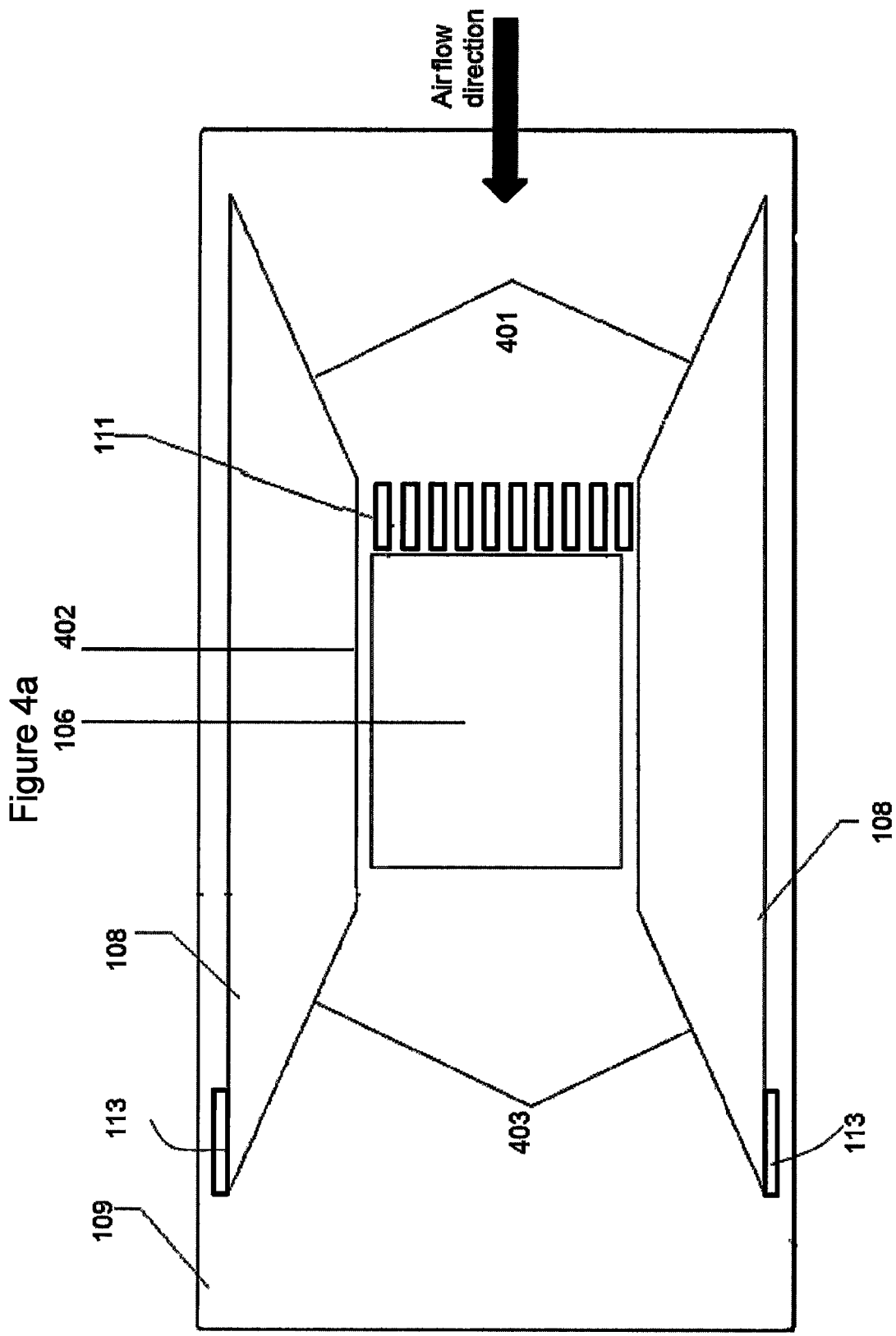

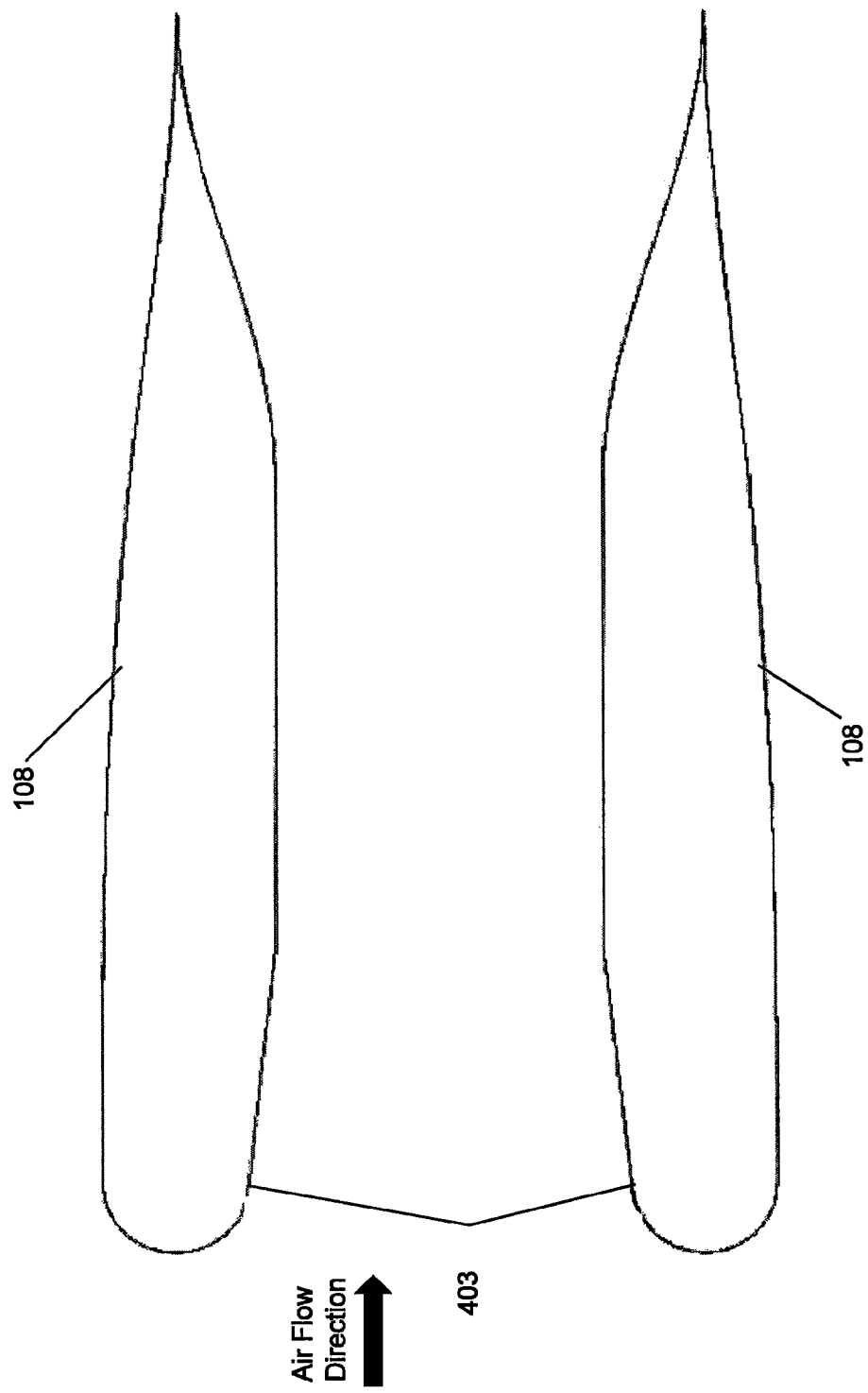

ENHANCED SYSTEM AND METHOD TO INCREASE THE TOTAL-TO-STATIC PRESSURE RATIO ACROSS A RAM AIR TURBINE USING SURFACE CONTOURED FLOW AGITATORS

GOVERNMENT LICENSE RIGHTS

The U.S. Government has a paid-up license in this invention and the right in limited circumstances to require the patent owner to license others on reasonable terms as may be provided for by the terms of Contract Number: N68335-06-C-0086, Contract Title: Development of a Compact Power Generation Turbine and Cooling System, Start Date: Dec. 5, 2005, End Date: Feb. 14, 2010, and Contract Number: N68335-09-C-0384, and Contract Title: Continued Development of a Compact Power Generation Turbine and Cooling System, Start Date: Aug. 5, 2009, End Date: Feb. 4, 2010, the entire disclosure of which are herein expressly incorporated by reference.

CROSS-REFERENCE TO RELATED APPLICATIONS

This application is related to U.S. application Ser. No. 12/333,770, filed Dec. 12, 2008, now U.S. Pat. No. 8,192,158; U.S. application Ser. No. 12/693,535, filed concurrently herewith: U.S. application Ser. No. 12/693,557, filed concurrently herewith; and U.S. application Ser. No. 12/693,564, filed concurrently herewith.

BACKGROUND OF THE INVENTION

1. Field of the Invention

The present invention relates to air driven power generators, particularly to power generation, size, weight, and efficiency improvements of ram-air driven turbines, and, more particularly, to a system and method that develop an aerodynamic low-pressure region at the discharge side of an air-driven turbine has been developed. The invention generates an increased ratio of total-to-static pressure across a Ram Air Turbine (RAT) developed for a combined ram air Prime Power Generating unit (PPG), resulting in increased turbine power generation when compared to a RAT without the invention. Improvements in the ram-air turbine design and the functionality of the turbine exhaust ducting provide increased power extraction capability resulting in a smaller and lighter power generator that minimizes the overall system size and weight.

2. Description of the Related Art

A RAT is a turbine driven by free-stream air that flows past an aircraft during flight. RATs can be used to develop mechanical power, which, if desired, can be directly converted into electrical power using a generator. The mechanical shaft power can also be used to power any mechanical device, including but not limited to hydraulic systems, vapor-compression cooling system compressors, circulation pumps, or refueling pumps. Electrical power can be used for electronic systems, such as onboard avionics equipment, electronic warfare equipment, and auxiliary backup power systems. RATs can be mounted directly onboard an aircraft fuselage or on secondary wing mounted pods or stores. At wing-mounted locations, the RAT can be located either at an external location where the turbine is directly exposed to free-stream air, or an internal location inside a pod, where the free-stream air is ducted to the turbine through an air inlet that is exposed to free-stream air. Prior work on internal RAT's have utilized ducts to deliver free-stream air to the turbine, by locating the RAT internally, pressure losses occur in the inlet ducting, which decreases turbine output power. They are also limited to ambient static pressure on the turbine discharge. The new invention makes it more feasible to locate a RAT in an interior location and extract additional power relative to a traditional internally mounted RAT.

U.S. Pat. No. 3,463,402 teaches the use of an ejecting exhaust nozzle to generate turbulence between two streams of gas, thus suppressing the noise normally generated from shear stresses at the interface of the higher velocity core gas stream with the lower velocity gas stream in a gas turbine engine.

U.S. Pat. No. 3,409,228 teaches an ejector nozzle for cooling a gas turbine engine and exhaust nozzle, whereby an ejector is in flow communication with an engine inlet and its purpose is to draw additional ram airflow through a bypass duct to provide cooling to the engine and exhaust nozzle.

U.S. Pat. No. 5,435,127 also teaches the use of an ejector nozzle to provide cooling airflow to components of a gas turbine engine; however, this system requires an additional boost pump.

U.S. Patent Application Publication No. 2009/0263244 A1 teaches the use of a mixer/ejector device that improves the performance of a water turbine through mixing of the turbine discharge and a secondary flow stream, increasing the turbine mass flow rate and overall energy extraction. This device is described as applying to ocean-, tidal-, and river/stream-currents.

U.S. Pat. No. 6,804,948 teaches the use of a lobe mixer for a jet engine that efficiently mixes two streams of gases by contouring of the lobes to reduce the noise normally generated while suppressing thrust losses caused by mixing.

U.S. Pat. No. 4,819,425 teaches the use of a lobe mixer with vent openings located within the lobe surfaces for noise suppression in a high bypass turbofan jet engine.

U.S. Patent Application Publication Nos. 2008/0105487 A1 and 2008/0105488 A1 both teach a curved lobe mixer for a bypass turbomachine comprising circumferentially distributed lobes that mix concentric gas streams within a converging-diverging flow nozzle to achieve noise suppression.

U.S. Pat. No. 4,149,375 teaches the use of a lobe mixer device with "scalloped" side walls that provide efficient mixing of two flow streams for improved noise suppression and/or engine performance with minimal pressure losses.

Above-referenced co-pending U.S. patent application Ser. No. 12/333,770 teaches the uses of converging/diverging ram air ejector nozzles to improve the performance of a RAT; however, this unit does not specifically address mixing techniques between the flow in the converging/diverging ram air ejector and the turbine exhaust, and mixing between the combined converging/diverging flow and the free-stream air surrounding the unit.

None of the cited prior art teaches the use of a converging/diverging ram air ejector nozzles with the use of a lobe mixer devices to enhance mixing between multiple flow streams to augment the total-to-static pressure ratio across a ram air driven turbine for the purpose of increasing power.

The mechanical power that can be developed from a RAT is a function of the specific work of the fluid, which is the total-to-static pressure ratio across the turbine rotor divided by the density of the fluid. The pressure at the face of the turbine rotor is a function of the aircraft velocity, altitude, inlet pressure drop, and environmental conditions and is specified as the total pressure or the maximum obtainable pressure that can be utilized for power generation. If a method to decrease the static pressure is not utilized, the power generating capability of the RAT is limited to the total pressure developed by the aircraft and the ambient or free-stream static pressure.

SUMMARY OF THE INVENTION

The present invention relates to any fluid-driven turbine for producing shaft work. When electric power is required, the ram-air driven turbine and electrical alternator are designed as an integrated unit and the alternator is the only driven mechanism of the turbine. An axial turbine is used for demonstration purposes, although it will be apparent to anyone skilled in the art that the present invention also applies to radial, impulse, reaction, and other types of turbines.

Therefore, in light of the benefits of an enhanced ram-air turbine driven integrated, lightweight, generator, as well as, the aforementioned shortcomings in the prior art, this invention has among other things, the following objectives:

To increase the total-to-static pressure ratio across a turbine resulting in increased power extraction, rotational speed, efficiency, and reduced size and weight.

BRIEF DESCRIPTION OF THE DRAWINGS

Other objects, advantages and novel features of the present invention will become apparent from the following detailed description when considered in conjunction with the accompanying drawings herein.

FIG. 4a is a top view of the compression walls, mounting plate and exhaust ducting for the ram-air driven electrical generator.

FIG. 4b is a top view of another embodiment of the compression walls.

DETAILED DESCRIPTION OF THE INVENTION

Figure 1A:
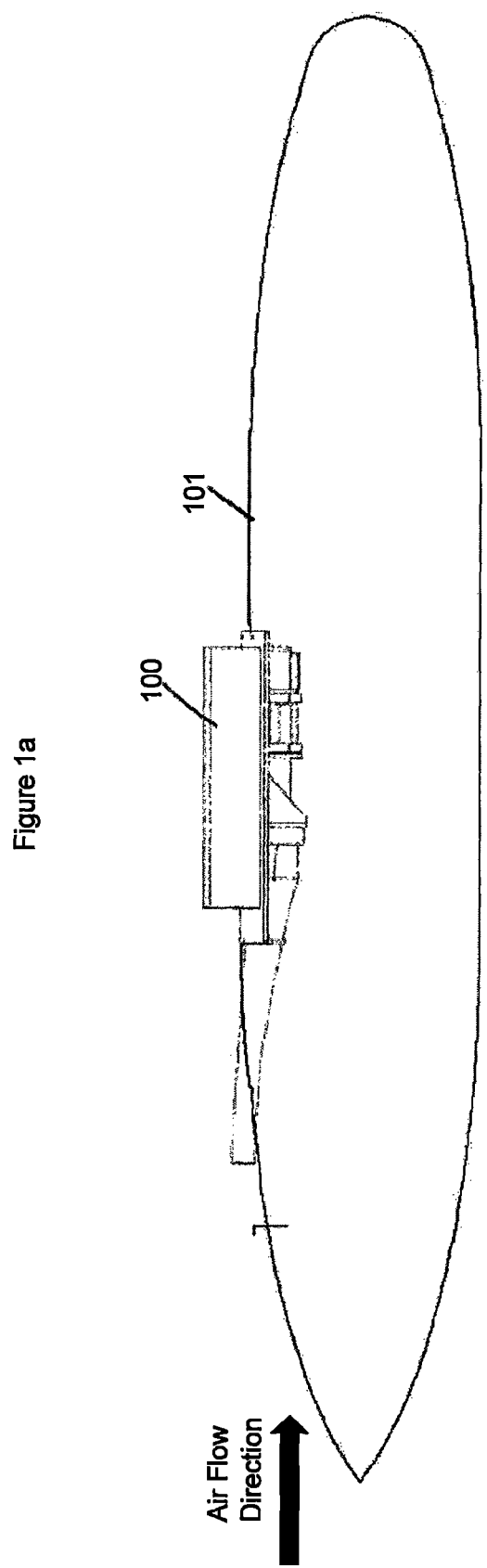
FIG. 1a is a side view of a complete internal air-driven turbine and generator unit mounted inside of an aerodynamic pod.

The present invention relates to air-driven turbine power generation equipment. This invention is not limited to air but can be used with any incompressible or compressible working fluid. This invention is also not limited to aircraft, but may be used with automobiles, submarines, towed body arrays, hydroelectric dams, and other embodiments that may benefit from improved energy transfer.

For systems requiring electrical power, the air-driven turbine can be used in conjunction with an electrical generator. The turbine may also have other driven mechanisms such as hydraulic systems (pumps, actuators, etc.) and compressors for cooling that are driven either solely or in tandem with the electric generator. The figures provided in the detailed description show an axial-flow turbine, although radial, impulse, reaction, and other types of turbines can be used as well. The following terms are defined to assist with the description of the invention as used the context of the present invention.

An air-driven turbine is a device that generates mechanical power through the expansion of air or other working fluid through a turbine rotor.

An exhaust duct is a generic term given to the mechanism for exhausting the working fluid from the turbine into the atmosphere. In the context of the present invention, the exhaust ducting is comprised of one or more components and provides multiple functions.

An exhaust compression wall is a term given to an aerodynamic geometric mechanism that enhances the turbine exhaust process. In the context of the present invention, the compression walls are comprised of one or more components and provide multiple functions to decrease the static pressure on the discharge side of a turbine.

A lobed mixer is a generic term for a known device that is used to enhance mixing between two or more fluid streams. The lobe mixer achieves efficient mixing by creating crossflow rotation of both fluid streams with respect to the other at each lobe, generating significant axial vorticity. The crossflow rotation is achieved by appropriately shaping the mixer surface from an initially flat cross section to a highly contoured lobe shape which protrudes into and out of both flow streams, as would be known by one of ordinary skill in the art. The vorticity augmentation increases the level of mixing between the two flow streams over the traditional free shear layer mixing that would occur without a lobe mixer. Increased fluid mixing achieves a lower turbine discharge static pressure nearer to the turbine rotor exit plane than would occur otherwise. This lobe mixer concept is applicable to air, water, or other working fluids A serpentine inlet duct is a term given to a mechanism that directs free-stream air or other working fluid from a high-pressure or high-velocity source to the turbine. The current embodiment is not limited to using a serpentine inlet, other geometries can be utilized such as flush mounted ducts, body blended, or other geometries that deliver the working fluid to the turbine.

Figure 1B:
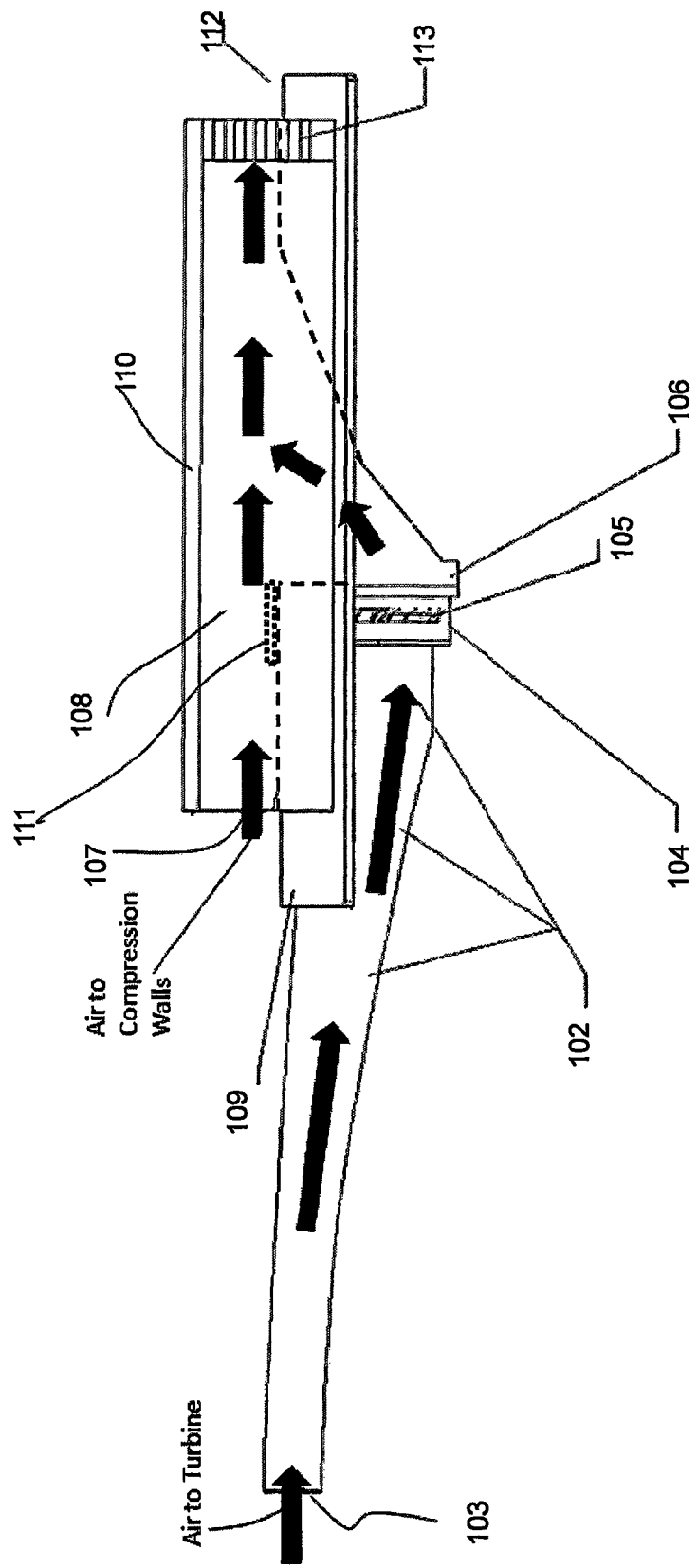
FIG. 1b is an enlarged side view of a currently preferred embodiment of the ram-air driven electrical generator shown in FIG. 1a but without the aerodynamic pod.

FIG. 1a is a side view of an internal air-driven turbine power unit 100 located inside an aerodynamic pod 101. FIG. 1b is a side view of the internal air-driven turbine power unit components without the pod. Referring to FIG. 1b, a serpentine inlet duct 102 is used to direct free-stream air to the turbine. Air enters the inlet at 103 and flows through to the turbine housing 104. Mounted inside of the turbine housing is the axial turbine 105. As the air flows through the turbine, the air imparts kinetic energy to the rotor which results in the air pressure decreasing prior to entering the turbine exhaust duct 106. At the same time as the air exits into the turbine diffuser, free stream air enters a passage 107 comprised of a pair of converging/diverging compression walls 108, mounting plate 109, cover plate 110, and inner lobe mixer 111 located at the exit of the turbine exhaust duct 106. The passage formed by the compression walls 108, mounting plate 109, and cover plate 110 are designed to capture free-stream air at 107 and accelerate it relative to the free stream air.

The inner lobe mixer 111 is designed to enhance mixing between the high-velocity, low static pressure region developed by the compression walls and the turbine exhaust discharging through the turbine exhaust duct 106; the two fluid streams are combined and then rejected out of the compression wall system to the ambient atmosphere 112.

To improve mixing between the combined flow from the present invention 100 and the free-stream fluid flowing around the aerodynamic body 101, additional lobe mixers 113 at the trailing edge of the compression walls 108 are utilized. This local acceleration and mixing of the free-stream air and turbine exhaust helps to create a lower static pressure area at the turbine discharge relative to the free-stream static pressure. The lower static pressure region at the turbine exhaust increases the total-to-static pressure ratio across the turbine. This increased pressure ratio allows the turbine to extract additional power relative to a turbine that does not have compression wall located at the turbine discharge.

The compression walls 108 that enable the development of localized accelerated flow are designed to optimize the low-pressure region behind the turbine and increase power extraction from the free-stream air.

Figures 2A, 2B:
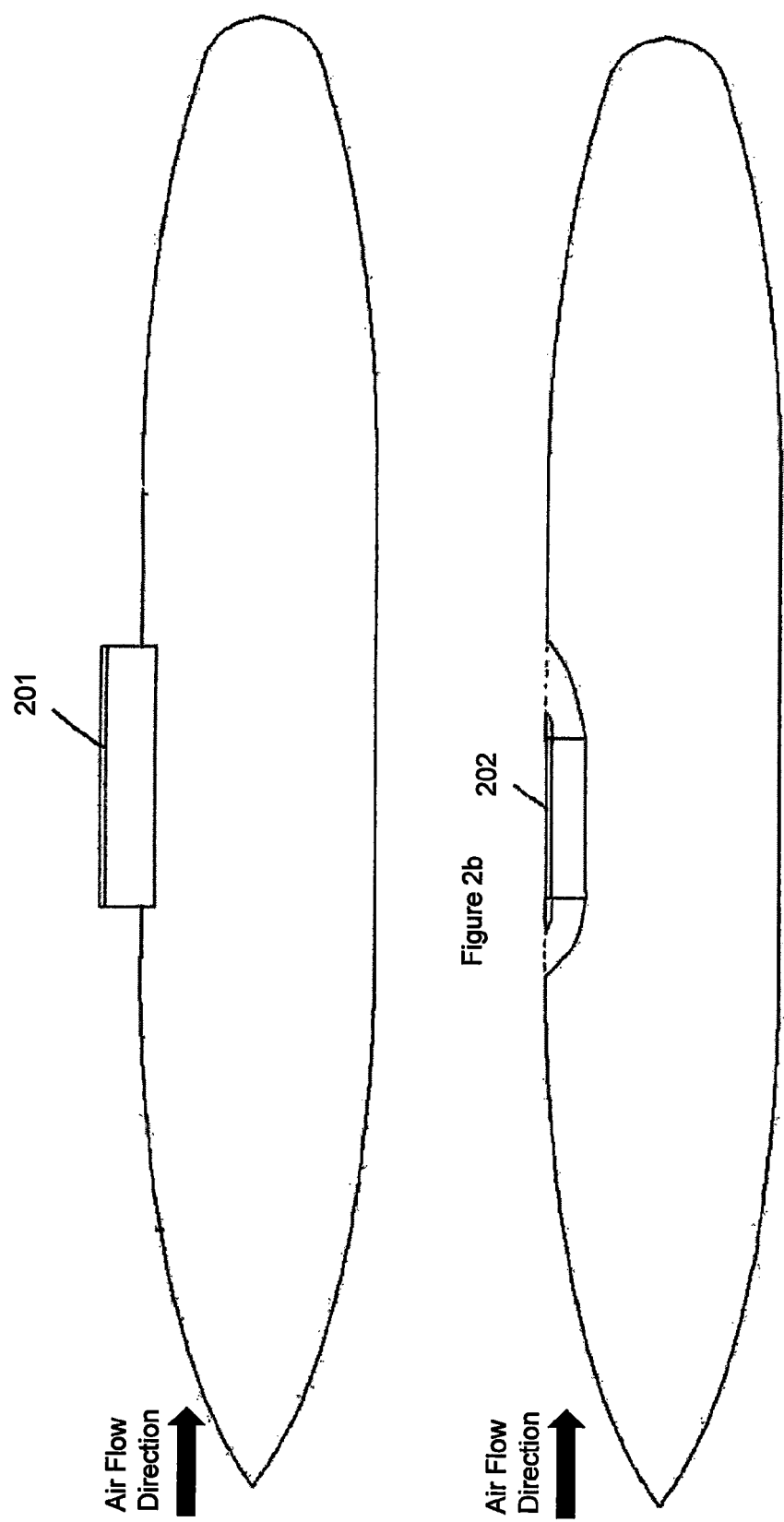
FIGS. 2a and 2b are side views of the exhaust ducting compression walls mounted on a pod, with the walls being mounted respectively on the exterior or interior of the pods overall profile of the ram-air driven electrical generator.

As shown in FIG. 2a, the passage formed by the compression walls 108, mounting plate 109, and cover plate 110 in one embodiment are mounted on the exterior of a pod 201. The current system is not limited to pods. Additional locations include exterior fuel tanks, aircraft fuselages, and other aerodynamic bodies that require power generation using free-stream air or other working fluid.

The currently preferred embodiment is also not limited to being located on the exterior surface of an aerodynamic pod. As shown in FIG. 2b, additional locations of the compression walls can be blended into the aerodynamic body 202 and free-stream air redirected to this location to achieve the same results. The illustrated embodiments are not limited be mounted on the top of the pod, the invention may be mounted in any configuration that benefits the performance of the system.

Figure 3:
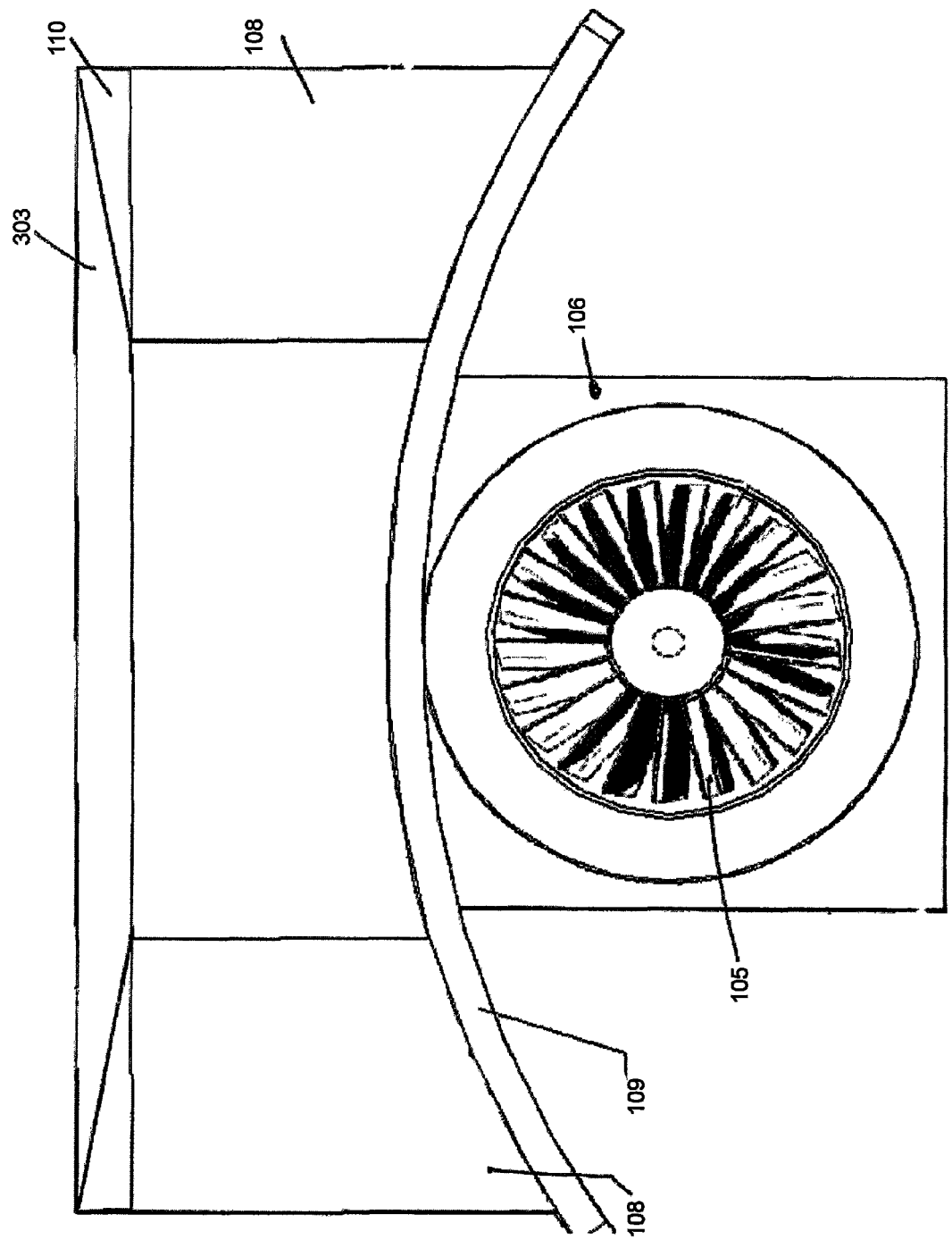
FIG. 3 is a front view of the turbine exhaust with compression walls and top of the ram-air driven electrical generator.

FIG. 3 shows a front view of the unit without the serpentine inlet duct 102. Two compressions walls 108 are utilized, one on each side of the turbine exhaust duct 110. However, additional compression walls can be designed into the system to affect performance. In place of individual separate compression walls, a unit can also be fabricated as a single component. The current embodiment of the compression walls is depicted as having a square cross sectional area, but the present invention is not limited by this configuration and may consist of other geometric cross sectional shapes, i.e., circular, elliptical, etc., that may additionally improve acceleration of the free stream air.

In one embodiment, each wall 108 is mounted to a plate 109 for attachment, as shown in FIG. 3. The compression walls 108 can be mounted to secondary structure if necessary.

For the illustrated embodiment, a cover plate 110 spans across the top of the two compression walls 108 to prevent air from escaping between the compression walls as shown in FIG. 3. The present invention is not limited to using a cover plate, and exhaust performance can be modified without a cover plate if necessary.

The cover plate 110 may also have an angled aerodynamic feature 303 that directs free-stream air into the exhaust ducting, this aerodynamic surface can be either straight, curved, or have other geometric variations to achieve optimal design.

As shown in FIG. 3, the mounting plate 109 of the ducting can have an arced shaped profile matching the outer profile of the pod. This surface can be varied to accommodate various profiles, such as a flat surface, arced surface, or other geometric shape to modify the conditions in the exhaust ducting.

FIG. 4a show a top view of the compression walls 108, turbine exhaust duct 106, mounting plate 109, and lobe mixer 111. Each compression wall 108 has an angled surface 401 to redirect the flow into to a constant area section 402 at the turbine exhaust duct. The air in the passage formed by the compression walls 108, mounting plate 109, cover plate 110, and lobe mixer 111 mixes the high-speed air in the secondary stream with the air exiting the turbine exhaust, and flows through an angled surfaces 403 at the discharge of the unit. Additional lobe mixers 113 at the exit of the compression walls are used to enhance mixing between the free-stream air around the aerodynamic body and the fluid exiting the compression walls. The location of the exit lobe mixers 113 are not limited to only the compression walls, they can also be located on the cover plate 110 in the exit region, or on the cover plate 109 at the discharge area. The lobe mixers are not limited to an exterior location, but can also be mounted on the inner surfaces of the compression walls 108, cover plate 110, or at any other location that can affect performance of the unit. The present invention is not limited to straight angled walls. Referring to FIG. 4b, walls with curved surfaces 403 and 404 or other geometric variations can replace the straight angled surfaces for performance modification.

Referring again to FIG. 4a, each compression wall 108 is designed to direct free-stream air toward a constant area section 402 surrounding the exhaust duct 106. This redirection of the air in the converging section of the compression walls accelerates the flow. The currently preferred embodiment is not limited to a constant area section and can be replaced with other geometric configurations to change the performance of the turbine exhaust ducting. The location of the compression walls 108 can also be varied with respect to the exhaust ducting 106 to modify performance. Examples include moving the walls forward or aftward relative to the turbine exhaust; the distance between the walls can also modify the performance of the system. Changes in the constant area section by increasing or decreasing the height of system may also be considered to modify the performance of the system.

The lobe mixer 111 can have rectangular shape, but other geometric shapes, such as sinusoidal, triangular, square or other shapes can be utilized to affect performance. The number of individual lobes on the mixer and/or the spacing between the lobes can be varied to affect performance.

The lobe mixers 113 at the trailing edge of the compression walls have a rectangular shape, but other geometric shapes, such as sinusoidal, triangular, and square or other shapes can be utilized to affect performance. Again, the number of individual lobes on the mixer and/or the spacing between the lobes can be varied to affect performance.

The embodiment shown herein was fabricated from aluminum, but can be fabricated from any material, preferably a lightweight material such as light alloys, ceramics, carbon fiber, and polymers.

The present invention is not limited to Ram Air Turbines, but may be utilized on other power generation system that can benefit with lower static pressures at a discharge point.

The location of the power generation system is not limited to a location internal to the pod. The system can be mounted external to the pod or lowered from inside the pod to an external location where the turbine is directly exposed to free-stream air. A cowling or other geometric device can still be mounted on the exhaust side of the turbine to increase the total-to-static pressure ratio.

The current system is not limited to converting mechanical power to electrical power; the mechanical power can be utilized to run hydraulic pumps, aircraft refueling pumps, aircraft refueling pods, cooling compressors, and cooling pumps and additional apparatuses that require mechanical or electrical power for operation.

We claim:

1. A system for producing shaft work, comprising:
   a turbine;
   a lobe mixer arrangement;
   and a compression wall arrangement having at least two converging/diverging walls on each side of the exhaust duct and being associated with the turbine and the lobe mixer arrangement such that a turbine discharge static pressure region is created which is lower than a static pressure that would exist without the lobe mixer arrangement with a resulting increased total-to-static pressure ratio across the turbine.

2. The system of claim 1, wherein the turbine is one of turbine, a radial turbine, an impulse turbine and a reaction turbine.

3. The system of claim 2, wherein a working fluid of the turbine one of compressible and incompressible working fluid.

4. The system of claim 1, wherein the lobe mixer arrangement and turbine are operatively mounted one of exteriorly and interiorly of an associated aerodynamic body.

5. The system of claim 1, wherein the lobe mixer arrangement is an inner lobe mixer located at an exhaust duct exit of the turbine.

6. The system of claim 5, wherein the compression wall arrangement which includes a cover plate arranged to prevent fluid from escaping between the compression walls, wherein the walls and cover plate form a passage located to capture and accelerate free-stream air relative to the turbine exhaust duct.

7. The system of claim 6, wherein the inner lobe mixer and compression wall arrangement are so arranged to allow the inner lobe mixer to enhance mixing between a high velocity, low static pressure region stream developed by the compression walls and a turbine exhaust stream discharged through the turbine exhaust duct with a combining of the streams prior to exiting the compression wail arrangement.

8. The system of claim 6, wherein the lobe mixer arrangement comprises inner lobe mixer and optionable at least one additional lobe mixer at a trailing edge of the compression walls.

9. The system of claim 8, wherein the cover plate has an angled surface which is one of a straight surface and a curved surface.

10. The system of claim 1, wherein the lobe mixer arrangement has a trailing edge configured as one of a rectangular shape, a sinusoidal shape, a triangular shape, and square shape.

11. The system of claim 1, wherein a permanent magnet alternator is integrally associated with a shaft of the turbine.

12. The system of claim 1, wherein a hydraulic pump is integrally associated with a shaft of the turbine.

13. The system of claim 12, wherein the hydraulic pump is a fuel pump.

14. The system of claim 1, wherein a refrigeration compressor is integrally associated with a shaft of the turbine.

15. The system of claim 1, wherein a coolant pump is integrally associated with a shaft of the turbine.

16. A method for producing turbine shaft work, comprising:

using a lobe mixer and converging/diverging compression walls at sides of a turbine exhaust duct to capture and locally accelerate a free stream fluid flow that undergoes enhanced mixing h turbine exhaust at a turbine exhaust duct exit to increase total-to-static pressure ratio across the turbine.

17. The method of claim 16, wherein the turbine shaft work is used to generate electric power via an alternator integrally associated with a turbine shaft.

18. The method of claim 16, wherein the turbine shaft work is used to drive one of hydraulic systems, a pump and a compressor.

19. The method of claim 16, wherein the capturing occurs by locating at least, one compression wall at one of an exterior or interior portion of an aerodynamic body associated with the turbine, and the enhanced mixing occurs by subjecting the free stream fluid flow to a lobe mixer.

20. The method of claim 16, wherein covering of the compression walls occurs to prevent the free stream fluid from escaping or to direct the free steam fluid into a region of the turbine exhaust duct exit.

* * * * *